Oct. 6, 1959   O. T. McILVAINE   2,907,920
HEADLIGHT DIMMER CIRCUIT
Filed Jan. 24, 1955
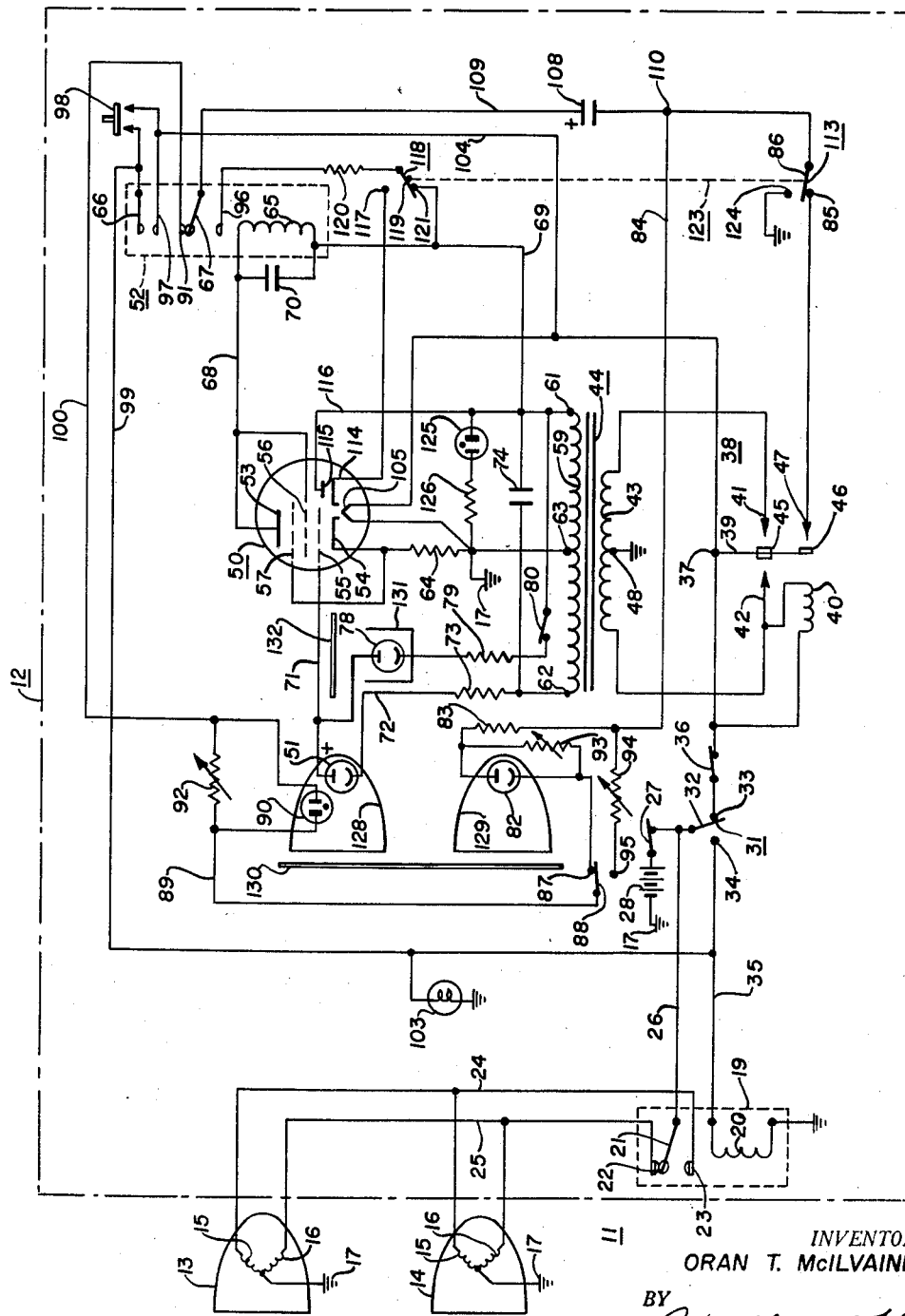
INVENTOR.
ORAN T. McILVAINE
BY Woodling and Krost,
attys.

United States Patent Office 2,907,920
Patented Oct. 6, 1959

2,907,920
HEADLIGHT DIMMER CIRCUIT
Oran T. McIlvaine, St. Charles, Ill.
Application January 24, 1955, Serial No. 483,500
18 Claims. (Cl. 315—83)

The invention relates in general to photocell control circuits and more particularly to headlight dimmer circuits utilizing photocells in automotive vehicles having headlights with upper and lower beam filaments.

Headlight dimmer control systems have been evolved which control automatically the selected illumination of upper and lower beam, or bright and dim, filaments of the headlights of the vehicle in which installed, a first vehicle, as controlled by a photocell responsive to incident light from oncoming automobiles or other vehicles having headlights. These systems have operated with varying degrees of success and have been hampered mostly by complexity of circuit arrangement, large bulk, high cost, and lack of completely automatic operation under all road and driving conditions.

It is therefore an object of this invention to make a headlight dimmer circuit which is simple, light weight, compact, inexpensive to manufacture and install in a vehicle, and which automatically takes care of every conceivable road and driving condition, yet retaining full flexibility of operation at the will of the operator of the vehicle.

Another object of the invention is to provide a headlight dimmer circuit for a first vehicle which is responsive to incident rays of all kinds, such as the red taillights and/or stop lights of an outgoing vehicle as well as the white headlights of an oncoming vehicle, so that the first vehicle's headlights will be automatically dimmed upon overtaking from the rear the outgoing vehicle.

Another object of the invention is to provide a headlight, dimmer circuit having a photocell which develops a slightly positive voltage under dark conditions to so condition the amplifier within the headlight dimmer circuit as to positively maintain the headlights of the vehicle in the upper beam condition without annoying intermittent flashing down to the lower beam condition due to instability in the photocell and amplifier circuit.

Another object of the invention is to provide a headlight dimmer circuit operable from alternating current to thus simplify the power supply so that no rectifier is necessary to power the amplifier tube therein.

Another object of the invention is to provide an automotive headlight dimmer circuit having an alternating current power source and an amplifier tube to energize a relay coil by half wave pulses wherein means is provided to filter the half wave pulses to prevent chattering of the relay contacts and to establish a small time delay to prevent momentary flashes of light from changing the headlights from the upper to lower beam conditions.

Another object of the invention is to provide a headlight dimmer circuit controllable by a main photocell with means responsive to the ambient light which strikes the main photocell in addition to the directed incident rays from other vehicles whereby the effect of the ambient light is counteracted to make the headlight dimmer circuit responsive substantiallly solely to the directed incident rays.

Another object of the invention is to provide in a headlight dimmer circuit a time delay circuit operating through a light source positioned in light exchange relationship with the main photocell of the dimmer circuit to maintain the lower beam headlight condition for a predetermined time delay period even though an oncoming vehicle should have its headlights dimmed, or for some other reason the incident rays from other vehicles should decrease.

Another object of the invention is to provide in a headlight dimmer circuit a variable time delay period of maintaining the headlights in the lower beam illumination condition in accordance with the intensity of the incdent rays from other vehcles.

Other objects and a fuller understanding of this invention may be had by referring to the following description and claims, taken in conjunction with the accompanying drawing, in which:

The single figure of the drawing illustrates the preferred embodiment of the invention with several alternative circuit operating conditions available by means of switches.

This invention is a continuation-in-part of patent applications Serial No. 313,023, filed October 3, 1952, Serial No. 424,656, filed April 21, 1954, and Serial No. 451,843, filed August 24, 1954.

The single figure of the drawing shows a headlight dimmer system 11 including a headlight dimmer circuit 12 and right and left headlights 13 and 14, respectively. The headlights have upper beam filaments 15 and lower beam filaments 16, the common connection of which is connected to ground 17. A power relay 19 has an actuating coil 20 and a contact blade 21 adapted for double-throw movement into engagement with a normally closed contact 22 and a normally open contact 23. The upper beam filaments 15 are connected by a conductor 24 to the contact 23, and the lower beam filaments 16 are connected by a conductor 25 to the contact 22. The contact blade 21 is connected by a conductor 26 through an instrument panel headlight switch 27 to the battery 28 of the vehicle in which the dimmer system is installed. The other terminal of the battery 28 is connected to ground 17. The vehicle is provided with a foot dimmer switch 31 which may be similar in construction to the conventional foot dimmer switches and has a contact blade 32 and first and second contacts 33 and 34. The actuating coil 20 of the power relay 19 has one end connected to ground and the other end connected by a conductor 35 35 to the contact 34.

A manual-automatic selector switch 36 is connected between the contact 33 and the terminal 37 of a vibrator 38, which may be of conventional construction. The vibrator 38, as shown, has a vibrating reed 39 and a driver coil 40 or other suitable motive source to vibrate the reed 39. The vibrator 38 also has opposed contacts 41 and 42 connected to opposite ends of a primary 43 of a transformer 44, with the intermediate tap 48 thereof grounded. A double faced contact 45 on the reed 39 alternately engages the opposed contacts 41 and 42. The reed 39 also carries a movable contact 46 to engage a stationary contact 47.

The headlight dimmer circuit 12 generally includes an amplifier 50, a main or control photocell 51, and a headlight control relay 52. The amplifier 50 has been shown as a vacuum tube pentode having an anode 53, a cathode 54, a control grid 55, a screen grid 56, and a suppressor grid 57.

The transformer 44 has a secondary 59 with high voltage first and second end terminals 61 and 62 and an intermediate terminal 63. The cathode 54 is connected through a current limiting resistor 64 to the intermediate terminal 63 and to ground 17. The headlight control relay 52 has an operating coil 65 and first and second movable operating blades 66 and 67 controlled by the coil 65. The operating coil 65 is connected by a conductor 68 to the anode 53 and by a conductor 69 to the first end terminal 61. A filter condenser 70 is connected across the operating coil 65. The main photocell 51 is connected by a conductor 71 to the control grid 55 and connected by a conductor 72 and a current limiting resistor 73 to the second end terminal 62. A condenser 74 is connected across the end terminals 61 and 62 to limit the arcing at the contacts 45 and 46.

An ambient light photocell 78 has one terminal thereof connected to the control grid 55, and the other terminal connected through a current limiting resistor 79 and a switch 80 to the end terminal 61. A time delay photocell 82 has one terminal thereof connected through a current limiting resistor 83 to a conductor 84 and to a terminal 110. A rectifier selector switch 123 has two poles or sections 113 and 118, and the switch section 113 has a contact blade 86 cooperating with a contact 85 to connect the terminal 110 to the vibrator contact 47. The other terminal of the time delay photocell 82 is connected through a contact 87 of an impedance selector switch 88 to a conductor 89. The conductor 89 is connected through a time delay neon lamp 90 to a stationary contact 91 of the headlight control relay 52. A variable resistor 92 is connected in parallel with the time delay neon lamp 90. Another variable resistor 93 is connected in parallel with the time delay photocell 82 and a variable resistor 94 is connected through a contact 95 of the impedance selector switch 88 to be in parallel with the time delay photocell 82 and the serially connected resistor 83.

The headlight control relay 52 has the movable blade 67 as a double-throw blade to engage the stationary contact 91 in the de-energized condition or to engage a stationary contact 96 in the energized condition of the operating coil 65. Also, a stationary contact 97 is adapted to be engaged by the movable blade 66 in the energized condition of the relay operating coil 65. A momentary override push button switch 98 may be provided and is connected across contacts 66 and 97. The contact blade 66 is connected by a conductor 99 to the conductor 35 and to the upper headlight beam indicator 103 which may for convenience be mounted on the instrument panel of the vehicle. The other terminal of the upper beam indicator lamp 103 is grounded. The stationary contact 97 is connected by a conductor 104 to the terminal 37, which is normally the ungrounded side of the vehicle battery 28. The amplifier 50 also has a filament 105 connected between this terminal 37 and ground 17.

A time delay condenser 108 is connected by a conductor 109 to the contact blade 67 and to the terminal 110. The amplifier 50 also optionally includes an extra diode rectifier section including a cathode 114 and an anode 115. The anode 115 is connected by a conductor 116 to the end terminal 61, and the cathode 114 is connected to a contact 117 of the section 118 of the rectifier selector switch 123. The switch section 118 has a movable blade 119 which may engage the contact 117 to connect the stationary contact 96 through a current limiting resistor 120 to the cathode 114. The switch section 118 also has another contact 121 connected to the conductor 69. Both sections of the rectifier selector switch 123 move in unison, and the switch section 113 also has a switch contact 124 connected to ground. A neon pilot lamp 125 is connected in series with a current limiting resistor 126 between ground and the end terminal 61 to indicate when the unit is operating.

The main photocell 51 is positioned within a parabolic reflector 128 and the time delay photocell 82 is also positioned within another reflector 129. These reflectors are means to direct incident rays from other vehicles, such as rays from headlights or taillights to the photocells 51 and 82. Positioned immediately in front of these reflectors is an optional infrared ray filter 130 so that only infrared rays are passed to the photocells 51 and 82. The ambient light photocell 78 may also be positioned at the front of the vehicle or other suitable location to have the ambient light applied thereto but preferably in a location so that the incident rays of other vehicles are not applied to the photocell 78. This may be accomplished by the shield 131. Optionally, an infrared ray filter 132 may be used in conjunction with the photocell 78 so that it also is responsive to infrared rays.

*Operation*

The headlight dimmer system 11 is designed for completely automatic operation of the upper and lower beam filaments 15 and 16 of the headlights of the vehicle in which the system is installed. Several switches have been shown and described to illustrate alternatives in circuit structure and to illustrate the flexibility of the system.

The instrument panel headlight switch 27 is that customarily found in vehicles to control illumination of the headlights upon operating the vehicle during darkness. With this switch closed current from the battery 28 is directed to the foot switch 31 which may be the conventional foot dimmer switch in present day vehicles but rewired in the event that this headlight dimmer circuit 12 is applied to an existing vehicle. The foot switch 31 is shown in the position for automatic control of the headlights with the blade 32 in contact with the contact 33. The manual-automatic selector switch 36 is closed so as to be in the automatic position; and when opened, it is in the manual position so that the foot dimmer switch 31 is then operable to control manually the selective energization of the headlight filaments. It effects this by engaging alternately the contacts 33 and 34. When contact 34 is engaged, relay coil 20 is energized to energize the upper beam filaments 15, and when contact 33 is engaged, the relay coil 20 is de-energized so that the low beam filaments 16 are energized.

With this switch 36 closed for automatic operation, battery voltage is applied to the vibrator terminal 37. It is also applied to the driver coil 40 to start vibration of the reed 39. This energizes the entire vibrator 38 and the transformer 44 to develop a high alternating voltage at the secondary end terminals 61 and 62.

The vibrator 38 may be of conventional construction and may be the type known as a synchronous vibrator which has one set of contacts, such as contacts 41 and 42, to handle the primary current and an additional set of contacts which in a synchronous vibrator circuit handle the rectification of the secondary current. One of these additional sets of contacts may be that shown at 47 to establish the half wave rectifying action for the secondary circuit.

Energization of the transformer secondary 59 provides energization to the amplifier 50 with anode voltage being applied from the end terminal 61 through the relay coil 65. The end terminals 61 and 62 are of opposite polarity relative to the grounded intermediate tap 63, and the terminal 61, for example, is alternately positive and negative. When the terminal 61 is negative, the tube 50 has negative voltage on the anode, and hence, is cut off. Thus the tube 50 is only operative upon those half cycles when the terminals 61 is positive relative to terminal 62. At such times the terminal 62 is negative relative to the intermediate tap 63; and as a result, a large negative voltage is applicable to the control grid 55 through the main photocell 51.

The amplifier is representative of any suitable form of amplifying means and the cathode 54 represents an emitting source of electrons, the anode 53 represents a collecting or receiving means for the electrons, and the control grid 55 is some control element or control means for controlling the flow of electrons from the cathode to the anode.

The main photocell 51 may in many circumstances be any type of photocell. In this application, however, a particular form of photocell has been found to provide novel features. There are generally three known types of photocells, the photoconductive, the photoemissive, and the photogenerative types. All three of these types exhibit some change of impedance upon change of incident light; however, the photoconductive type is one which relies primarily upon this change of impedance. The photoemissive type is that generally mounted in a vacuum tube, where generally an external voltage is applied to the anode, and this photoemissive type is one which relies primarily upon the fact that it generates a voltage within the tube. The photogererative type is generally a disc type of solid material not in a vacuum tube, such as is used in many photographic light meters, and develops a voltage at the terminals of the photogenerative disc. The preferred form of photocell for this application is generally classed as being of the photogenerative type, such as cadmium selenide or the cadmium sulphide type. This particular type of photocell as used in the present circuit is one which relies primarily upon the change of impedance upon variation of an incident light and it has a relatively high dark resistance. When light falls upon this main photocell 51, the impedance thereof is reduced materially so that a large negative voltage from the end terminal 62 is applied to the control grid 55. This biases off the tube 50 and thus the relay coil 65 is de-energized. This amplifier tube may be one such as type 6AK6 which has a region of greatest sensitivity to grid voltage at about a minus one to zero volts on the grid. Under dark conditions, with relatively high impedance of the main photocell 51, this negative voltage from the end terminal 62 is prevented from being applied to the control grid 55; hence, the tube 50 passes enough current to actuate the headlight control relay 52, yet this current may be small, in the order of six milliamperes.

Under dark conditions one desires the upper headlight beam. This is accomplished by the fact that the main photocell 51 has a high dark resistance, in the order of 1,000 to 5,000 megohms, with a slight positive charge on the control grid 55. This determines that the amplifier tube 50 is in conducting condition to energize the relay coil 65. This pulls movable blades 66 and 67 downwardly, thus blade 66 engages contact 97 and this applies the battery voltage from terminal 37 through conductors 104 and 99 to the power relay 19. Energization of this relay moves contact blade 21 downwardly into engagement with contact 23 to energize the upper beam filaments 15. Under the conditions of incident light on the main photocell 51 a negative voltage from the end terminal 62 is applied to the control grid 55 which cuts off the tube 50 and de-energizes the relays 52 and 19. Voltage is thus applied to the lower beam filaments 16 directly from the car battery 28 through conductor 26 and the contacts 21—22.

Under dark conditions with the upper beam filaments illuminated the headlight control relay 52 is energized. The contact blade 67 thus engages contact 96 to establish a charging circuit or the time delay condenser 108. This condenser charging circuit is from the terminal 61, which is positive on alternate half cycles; and during these positive half cycles charging current flows from a terminal 61 through the conductor 69, the switch blade 119, the charging current limiting resistor 120, the relay contacts 67—96, the condenser 108, the contacts 85—86, through the vibrator contacts 46—47 to the terminal 37 and thence through the vehicle battery 28 to ground to return to the center tap 63 of the secondary 59. It is during these positive half cycles that the vibrator contacts 46—47 are closed and thus the condenser 108 is charged only on positive half cycles of the terminal 61. This condenser 108 can charge in about one-half second depending upon the value chosen for the current limiting resistor 120.

When the headlight control relay 52 is de-energized, the movement of the contact blade 67 into the position shown in the drawing establishes a condenser discharge circuit which provides a time delay feature in the dimmer circuit 12. This condenser discharge circuit is from the upper or positive terminal of the conednser 108 through the relay contacts 67—91, the conductor 100, the time delay neon lamp 90, and one of the impedances 82 or 94, depending upon the position of the impedance selector switch 88, to return to the negative terminal of the condenser 108. This discharge of the condenser 108 illuminates the time delay neon lamp 90 for a predetermined time delay period which may be in the order of three to five seconds. This time delay feature makes certain that the main photocell 51 remains illuminated for the time delay period, and thus once the headlight control relay becomes de-energized, it remains de-energized for this time delay period before the headlights return to the upper beam condition.

This time delay feature is valuable in providing automatic operation of the headlamp dimmer system. For example, a first vehicle equipped with the dimmer system 11 may approach an oncoming second vehicle which is using its upper beam headlights. The light from such upper beam at a certain distance between the approaching vehicles, for example, 1,000 feet, will be sufficient to actuate the main photocell 51 so that the tube 50 is cut off and relays 52 and 19 are de-energized, thus changing the first vehicle's headlights from the upper to the lower beam condition. If a short time thereafter, for example, one-half second, the second oncoming vehicle should change its headlights from the upper beam to the lower beam condition, then the incident light upon the main photocell 51 would be materially reduced and might attempt to change the dimmer circuit 12 back to the upper beam condition were it not for the added illumination by the time delay neon lamp 90. Thus, this time delay feature establishes that the lower beam headlight condition of the first vehicle would be maintained for a period long enough so that the two vehicles will approach to a distance whereat the incident light from the lower beams of the headlights of the oncoming vehicle would be sufficient to maintain the de-energization of the relays 52 and 19.

The use of a cadmium selenide or cadmium sulphide type of photocell achieves the additional novel result in this circuit in that this photocell develops a slight positive voltage, up to about one-half volt under dark conditions, which positive voltage is applied to the control grid 55 to make certain that the amplifier tube 50 is passing sufficient current to maintain the relay 52 energized. Thus, the fact that the main photocell 51 develops a slight positive voltage is in effect the same as having a built-in "C" battery in the photocell so that a bias is applied to the amplifier tube 50 to make it operate at the desired point on its grid-volts versus plate current curve.

The use of the cadmium selenide or cadmium sulphide type of photocell also achieves an additional novel feature of the invention by its sensitivity to infrared rays. Many prior art headlight dimmer systems were not sensitive to infrared rays and thus were defective in that when a first vehicle equipped with a headlight dimmer system approached the rear of an outgoing vehicle proceeding along ahead of the first vehicle, the upper headlight beam of the first vehicle was maintained illuminated, to the annoyance of the operator of the second vehicle. In the present invention the red taillights and/or stop lights of the second or outgoing vehicle have been found to be incident rays of sufficient brightness to actuate the headlight dimmer circuit 12 to the lower filament beam condition, thus achieving automatically a dimming of the first vehicle's headlights on approaching the rear of a second vehicle.

The infrared filter 130 and the sensitivity to infrared of the main photocell 51 also achieves another novel feature in that it provides automatic compensation for variations in intensity of white headlights of oncoming vehicles. Automotive vehicles in use in the United States at the present time operate on a nominal voltage of 6.3 volts. This may be as low as 5.5 volts if the generator in the vehicle is not capable of supplying the complete electrical load at any given time or may be up to 7.5 or even 8 volts if the conventional voltage regulator in the vehicle is not set properly and/or if the electrical load is light in comparison with the generator capacity of the vehicle. This gives a range of at least 30 percent in the voltage applied to the vehicle headlights. A great proportion of the voltage applied to a filamentary lamp is used in merely bringing the filament up to operating temperature and it is only perhaps the last 10 or 20 percent of the voltage which produces visible light, the other 80 or 90 percent producing predominantly infrared rays. Thus, the use of the infrared ray filter 130 establishes that no matter whether the oncoming vehicle's headlights are operating at 5.5 volts or at 8 volts there is only a slight difference in intensity of the infrared rays which reach the main photocell 51; and thus the automatic compensation feature is achieved in that the headlight dimmer circuit 12 is much more uniformly responsive to headlights of all oncoming vehicles.

The utilization of infrared rays in the invention provides still another novel feature because by cutting down the intensity of the total electromagnetic waves reaching the main photocell 51 from incident rays or oncoming vehicle headlights, the sensitivity of the circuit may be increased over what it would be if the dimmer circuit 12 operated on visible light; and thus this increased sensitivity is available in the circuit so that relatively low intensity red taillights of a second outgoing vehicle will actuate the dimmer circuit to the lower beam condition at a distance, e.g. 200 or 300 feet, which is acceptable for normal driving conditions. If this were not the case and the circuit operated on white light, then one might have to approach within two or three feet of a taillight in order to have sufficient infrared rays strike the photocell to make the circuit operate to the lower beam condition. This is, of course, an impractical situation in today's highway driving and thus the utilization of infrared rays makes the circuit feasible for operation on both oncoming headlights and outgoing taillights.

The utilization of infrared rays provides still another novel feature in that it has been found that with the photocell units, especially the main photocell 51, positioned behind the windshield of an automotive vehicle, for instance in the lower left corner of the windshield, snow or dirt is apt to collect on the windshield immediately in front of this main photocell 51. By using infrared rays, these rays penetrate snow and dirt to a far greater extent than visible light; and hence, the entire dimmer circuit 12 works far more satisfactorily than the prior art forms dependent upon the amount of visible light striking the photocell.

The dimmer circuit 12 utilizes the filter condenser 70 in a dual capacity. The dimmer circuit 12 operates directly from an alternating current source; namely, the secondary 59 with, of course, the tube 50 being cut off on the half cycles when end terminal 61 is negative. On the other half cycles when terminal 61 is positive, the tube 50 passes current in accordance with the incident light on the main photocell 51. Thus, the amplifier 50 may be considered as having a self-rectifying action in its operation from an alternating current source. The tube 50 normally passes current under dark conditions and the relay 52 is thus normally energized under dark conditions. It is energized by half wave pulses of plate current and the condenser 70 is large enough to act as a filter for these half wave pulses so that it prevents chatter of the contacts of the relay 52 to thus make certain that these contacts remain closed. The condenser 70 also has a slight time delay feature with this time delay in the neighborhood of .1 to .4 second. Driving conditions provide a multitude of variations in lighting conditions for the first vehicle equipped with the headlight dimmer system 11. For example, if the vehicle turns a corner and the headlights of the vehicle momentarily are reflected from a white sign, then this momentary flash of light is reflected to the main photocell 51. This puts a negative pulse momentarily on the control grid 55 to momentarily cut off the tube 50. The condenser 70 comes into play in such case because it prevents the momentary de-energization of the operating coil 65 for a time delay of .2 to .3 second, for example, and thus the headlights are maintained in the upper beam condition which is desirable so that such momentary flashes of light from light reflected from signs or lightning flashes, etc., do not change the vehicle's headlights from the upper to the lower beam condition.

The entire dimmer circuit also has been found to be extremely simple and reliable in operation since only one vacuum tube is used and also to be remarkably uniform in sensitivity despite fluctuations in the supply voltage from the battery 28. This supply voltage may vary 100 percent; namely, between 4 and 8 volts, yet the output current to the relay coil 65 will vary only about five percent. A reason for this is that the amplifier 50 operates on alternating current rather than direct current, and with variations of positive voltage from the end terminal 61 to the anode 53, there is a corresponding variation in negative voltage from the end terminal 62 to the grid 55. These variations tend to cancel each other and thus the anode-cathode current of the amplifier remains remarkably uniform despite source voltage variations. This is an added advantage over the prior art headlight dimmer circuits which utilized direct current for operation of the amplifier tube because with such direct current systems generally elaborate circuits for voltage regulation were also required in order to maintain the anode voltage on the amplifiers reasonably constant to keep the operation of the dimmer circuit at all uniform. Such prior art dimmer circuits thus required an additional rectifier arrangement to obtain the direct current and then required voltage regulator devices to maintain such direct current operating voltages constant. The present circuit eliminates this added circuit structure and thus increases the simplicity, ruggedness, and reliability of the entire headlight dimmer system 11.

The time delay period during which the time delay neon lamp 90 is illuminated by the discharge of the condenser 108 after change to the lower beam condition is primarily determined by the impedance in the circuit. When the impedance selector switch 88 is moved to the lower position with resistor 94 in the circuit, then the impedance of this resistor will primarily determine the time delay period. This resistor 94 may be fixed for economic reasons or may be made variable as shown to suit varied driving conditions. The variable resistor 92 is connected in parallel with the time delay neon lamp 90 to more definitely establish the time at which the neon lamp 90 is extinguished. This resistor 92 has also been shown as variable, which is optionally desirable to be able to vary the point at which the neon lamp is extinguished.

With the impedance selector switch 88 in the upper position, the condenser discharge current flows through the time delay photocell 82. This provides still additional automatic features. As an oncoming vehicle approaches, the light from its headlights or other incident rays varies inversely as the square of the distance; therefore, the light of its headlights at one hundred feet is one hundred times as intense as the light therefrom at one thousand feet. By using this time delay photocell 82 in the condenser discharge circuit, the impedance thereof decreases as the oncoming vehicle approaches; and thus when the oncoming vehicle is quite close, the high intensity from its headlights makes certain that the condenser discharge circuit has a sufficiently lower impedance therein to discharge quickly; and thus, the time delay neon lamp 90 will be extinguished before the two vehicles pass. This assures that the time delay period will definitely have expired before the vehicles pass; and thus, the dimmer circuit 12 will be conditioned ready for immediate return to the upper beam condition as soon as the vehicles have passed each other.

This has definite advantages in many driving conditions. For example, if a first vehicle equipped with a dimmer circuit 12 is proceeding along a highway and a second vehicle turns from a side road to approach toward the first vehicle for only about one second before the vehicles pass, the vehicles will be quite close for this one second; and thus, the intensity of the headlight beam from the second vehicle will be high enough to lower the impedance of the time delay photocell 82 so that the time delay period is only about one second; and thus, the first vehicle's headlights change to the lower beam condition about two-tenths of a second after the second vehicle's headlights illuminate the main photocell 51, and yet the time delay photocell 82 assures that the time delay period will be sufficiently shortened so that as soon as the vehicles pass each other the first vehicle's headlights will return to the upper beam condition.

The use of the time delay photocell 82 permits use of a time delay period which may be as great as ten or fifteen seconds rather than the three to five second suggested delay period if the impedance 94 is used. By using the time delay photocell 82 with a maximum time delay period of ten to fifteen seconds, which can be shortened to one second upon high intensity headlights close to the first vehicle, an additional automatic feature is obtained. In high speed open country driving a three to five second delay period is often the most desirable because here the first vehicle's headlights would be actuated to the dim condition at about one thousand feet. With vehicles approaching each other at a relative speed of one hundred miles an hour or one hundred forty-six feet per second, the three to five second time delay period would assure that the vehicles were relatively close, say three hundred to five hundred feet, before the time delay period expired. However, in suburban driving where the speeds are lower one would still desire that the first vehicle's headlights would be actuated to the dim or lower beam condition at say one thousand feet, yet the relative speeds of the automotive vehicles are lower, e.g., fifty to seventy miles an hour, and thus a time delay period of about ten seconds is more desirable. Thus, in this suburban driving of lower relative speeds of the vehicles, the time delay photocell 82 is especially valuable by not only being capable of shortening the time delay period to about one second, as mentioned above, but also being capable of lengthening the time delay period to ten or fiften seconds.

The resistor 93 may be used in parallel with the time delay photocell 82 to vary the sensitivity of the time delay photocell 82 relative to the sensitivity of the main photocell 51. The resistor 93 has been shown as variable, which is an optional feature, to vary the sensitivity of the photocells 51 and 82 in any particular dimmer circuit 12.

The time delay photocell 82 has been shown as positioned behind the infrared ray filter 130, and this is an optional feature in the event that it is desired to have this photocell 82 responsive substantially solely to infrared rays as well as the main photocell 51 being responsive to these infrared rays.

The ambient light photocell 78 provides still another feature of the invention by automatically compensating for the amount of ambient light in the atmosphere surrounding the vehicle. Many headlight dimmer systems work extremely poorly, if at all, under dusk or dawn conditions. At dusk the sky is still quite light, for example, because of dust particles in the air; yet the highway is relatively dark. Most states have laws requiring the use of headlights one-half hour before sunset until one-half hour after sunrise; and during these dusk and dawn periods of relatively bright illumination in the sky, headlight dimmer systems are very apt not to work satisfactorily at all. The ambient light photocell 78 is a means for in effect varying the sensitivity of the dimmer circuit 12 and then automatically compensating for the amount of ambient light so that the dimmer circuit 12 is responsive substantially solely to the incident light thereon directed from oncoming vehicle headlights or outgoing vehicle taillights by the parabolic reflector 128. The ambient light photocell 78 operates in this fashion because it is connected between the control grid 55 and the end terminal 61 which is positive in the half cycles when the tube 50 is operative. Therefore, the more ambient light present, the lower the impedance of the photocell 78 and thus a greater positive voltage is applied to control grid 55. The main photocell 51, since it faces toward the front of the vehicle, is naturally also responsive to the ambient light. This ambient light during dusk or similar conditions lowers the impedance of this main photocell 51. This attempts to establish a high negative voltage on the control grid 55 from the end terminal 62, thus tending to cut off the tube 50 and establishing the lower beam condition. Because the terminal 63 is preferably a mid-tap, this means that terminal 62 is as much negative as the terminal 61 is positive; and thus, the ambient light photocell 78 applies to the control grid as much positive voltage as negative voltage is applied to the control grid by means of ambient light on the main photocell 51. Therefore, the effect of the ambient light is canceled out and the control of the tube 50 is effected only by the incident rays from other vehicles. The ambient light photocell 78 has also been shown as positioned behind the shield 131 to prevent incident rays from striking this photocell, and thus it is responsive solely to the ambient light. The infrared filter 132 has also been shown in conjunction with this photocell 78, which is optionally desirable to establish the fact that the same intensity of ambient light will reach the ambient light photocell 78 as reaches the main photocell 51. Alternatively, an arrangement such as a paralleled fixed or variable resistor similar to the resistor 93 may be used on one of the photocells 51 and 78 to vary the relaive sensitivity thereof.

The rectifier selector switch 86, when in the lower position shown, utilizes half wave direct current pulses from the right half of the secondary 59 to charge the condenser 108, as described above. An alternative condenser charging circuit is also shown as that achieved by moving the rectifier selector switch 123 to the upper position. In this condition the extra diode section 114—115 within the envelope of the amplifier tube 50 is put into use. The anode 115 is connected to the positive terminal 61, at least it is positive during alternate half cycles. This current flows through the diode section 115—114 through the section 118 of switch 123, through the current limiting resistor 120, through the relay contacts 67—96 when the relay coil 65 is energized, through the condenser 108, and return to ground through the switch blade 122 and contact 124. This thus illustrates an alternative means for charging the condenser 108, utilizing a diode rectifier rather than the extra set of contacts 46—47 on the vibrator 38.

The entire headlight dimmer system 11 will therefore be seen to achieve a host of novel features and to automatically compensate for all various driving conditions. Several switches have been shown to illustrate the complete flexibility of the system yet many of these may be eliminated in a completely automatic system. The operator of the vehicle still has available for operation the foot dimmer switch 31 with which he may override the automatic control for use in signaling with the headlights of the vehicle, for example, in desiring to pass a vehicle the foot dimmer switch 31 may be actuated to flash a warning signal to the outgoing vehicle ahead. The momentary override switch 98 may optionally be provided for the same purpose since depressing this push button switch will momentarily energize the relay coil 20 to change from the upper to the lower beam condition.

It will thus be seen that the entire circuit is simple, contains a minimum of parts, yet achieves a maximum of automatic features, and the unit may be adapted for installation in vehicles at the factory or may be adapted for existing vehicles. The circuit 12 is easily attached to existing vehicles because only three connections are necessary between the circuit 12 and the existing vehicle. These are a ground connection simply made, the conductor 99, and the conductor at the switch 36 with a minimum of rewiring of the foot dimmer switch 31.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a headlight dimmer circuit, amplifier means having cathode and control means, a power supply having first and second voltage terminals of different potentials, a photocell having variable impedance characteristics with variations in light intensity thereon, means for connecting said photocell and the voltage between said first and second terminals in circuit with said cathode and control means, said photocell having high dark resistance for a low value of dark current and having the property of developing a bias voltage on said control means under dark conditions, said bias voltage establishing the operating condition of said amplifier means under dark conditions.

2. In an automotive headlight dimmer circuit, amplifier means having cathode, anode, and control means, a power supply having first and second high voltage terminals and an intermediate terminal, said first and second terminals being of opposite polarity relative to said intermediate terminal at any given instant, a headlight control relay having an operating coil connected between said anode means and said first terminal, means for connecting said intermediate terminal to said cathode means, a photocell having variable impedance characteristics with variations in light intensity thereon, a current limiting resistor, said photocell and said resistor being connected in series between said control means and said second terminal, said photocell having high dark resistance for a low value of dark current and having the property of developing a small positive voltage on the terminal connected to said control means under dark conditions, said small positive voltage establishing said amplifier means in current conducting condition under dark conditions to energize said relay to the actuated condition.

3. In an automotive headlight dimmer circuit having upper and lower beam conditions, a vacuum tube amplifier having a cathode, and anode, and a control grid, a vibrator power supply operable from a direct current source, a transformer connected to be energizable from said vibrator, a secondary on said transformer having first and second high voltage end terminals and an intermediate terminal, said first and second end terminals being of opposite polarity relative to said intermediate terminal at any given instant, a headlight control relay having an operating coil connected between said anode and said first end terminal, a smoothing and time delay condenser connected across said operating coil, means for connecting said intermediate terminal to said cathode, a photocell having variable impedance characteristics with variations in light intensity thereon, a current limiting resistor, said photocell and said resistor being connected in series between said control grid and said second end terminal, said photocell having high dark resistance for a low value of dark current and having the property of developing a small positive voltage on the terminal connected to said control grid under dark conditions, and said small positive voltage establishing said amplifier in current conducting condition under dark conditions to energize said relay to the actuated condition to maintain a headlight upper beam condition.

4. In a headlight dimmer circuit for use in a first vehicle and operable from the vehicle battery and utilizing a photocell illuminable by headlights or incident light of a second vehicle to control the conductivity of the photocell, the provision of a vibrator power supply energizable from said battery, a transformer connected to be energized from said vibrator, an amplifier tube having control elements including a cathode and connectable to said photocell for control thereby to be normally passing current under dark conditions, an anode in said amplifier tube, a secondary on said transformer having first and second end connections and an intermediate tap, a headlight control relay having contacts controlled by an operating coil connected between said first end connection and said anode to be operable on half wave pulses from said amplifier, means for connecting said cathode to said intermediate tap, and a filter and time delay condenser connected across said relay operating coil to prevent chatter of said relay contacts and to prevent de-energization of said relay operating coil upon a momentary flash of light illuminating said photocell.

5. In a headlight dimmer circuit for a first vehicle, a vibrator power supply energizable from a direct current source, a transformer connected to be energizable from said vibrator, a secondary on said transformer having first and second end terminals and an intermediate terminal, an amplifier tube having an anode, a control grid, and a cathode, a headlight control relay having an operating coil, a main photocell, said relay operating coil being connected between said anode and said first end terminal, means for connecting said cathode to said intermediate terminal, means for connecting said main photocell between said control grid and said second end terminal, an ambient light photocell connected between said control grid and said first end terminal, means for directing a preponderance of the incident rays from other vehicles onto said main photocell, said main photocell also being responsive to the ambient light, means for establishing said ambient light photocell responsive to the ambient light, whereby the current passed by the main photocell to the control grid from said second end terminal is counterbalanced by the current passed by the ambient light photocell to the control grid from the said first end terminal to counterbalance the effect of the ambient light and make said headlight dimmer circuit responsive substantially solely to the incident rays from other vehicles.

6. In a photocell circuit, an electron tube, a control relay having an operating coil energizable from an alternating current source through said electron tube, a main photocell connected to control said relay coil through said electron tube, first and second double-throw contacts operable by said control relay, a time delay condenser, means for establishing a charging circuit for said time delay condenser from a direct current source through said first contacts, means for establishing a time delay condenser discharging circuit through said second contacts, and illumination means in said condenser discharge circuit and energized directly by said condenser to increase the illumination on said main photocell.

7. In a photocell circuit, a control relay having an operating coil, a main photocell connected to control said relay coil, means for connecting said relay operating coil to control a load, rectifier means, first and second double-throw contacts operable by said control relay, a time delay condenser, means for establishing a charging circuit for said time delay condenser from said rectifier means through said first contacts, means for establishing a time delay condenser discharging circuit through said second contacts and a time delay lamp energized directly by said condenser discharge circuit to increase the illumination on said main photocell.

8. In a headlight dimmer circuit for a first vehicle having headlights with upper and lower beams, a headlight control relay having an operating coil, a main photocell connected to control said relay coil, means for connecting said relay to control the headlights of the first vehicle in the upper and lower beam illumination conditions, rectifier means, first and second double-throw contacts operable by said headlight control relay, a time delay condenser, means for establishing a charging circuit for said time delay condenser from said rectifier means through said first contacts, a time delay lamp, means for establishing a time delay condenser discharging circuit through said time delay lamp and said second contacts, and means for establishing said time delay lamp in light exchange relationship with said main photocell, whereby said condenser may be alternatively charged and discharged and upon discharge to energize said time delay lamp to thus illuminate said main photocell for a predetermined time delay period.

9. In a headlight dimmer circuit for a first automotive vehicle having headlights with upper and lower beams, a vibrator power supply energizable from a direct current source, a transformer connected to be energizable from said vibrator, a secondary on said transformer having first and second terminals and an intermediate terminal, an amplifier tube having an anode, a control grid, and a cathode, a headlight control relay having an operating coil, means for connecting said operating coil between said anode and said first terminal, means for connecting said cathode to said intermediate terminal, a main photocell connected between said control grid and said second terminal, said photocell and said amplifier tube being so connected that under dark conditions said amplifier tube passes sufficient anode-cathode current to energize said relay operating coil to energize the upper headlight beam of the first vehicle, rectifier means operable from said vibrator power supply, normally open and normally closed double-throw contacts operable by said headlight control relay, a time delay condenser, means for establishing a charging circuit for said time delay condenser from said rectifier means through the normally open contacts of said headlight control relay, a time delay neon lamp, means for establishing a time delay condenser discharging circuit through said time delay neon lamp and the normally closed contacts of said headlight control relay, means for establishing said time delay neon lamp in light exchange relationship with said main photocell, a time delay photocell, said time delay photocell having variable impedance in accordance with the incident light thereof, means for directing substantially the same quantity and type of light rays on said time delay and main photocells and predominantly the incident rays from other vehicle headlights, and means for establishing said time delay photocell in series in said condenser discharge circuit, whereby the variable impedance of said time delay photocell establishes a variable time delay period of condenser discharge through said time delay neon lamp such that, as an oncoming vehicle approaches and the light from the headlights thereof increases, the impedance of said time delay photocell decreases to thus positively establish the termination of the variable time delay period prior to the passing of the two vehicles so that said headlight dimmer circuit is conditioned ready for immediate return to the upper headlight beam illumination condition at the instant of passing of the vehicles.

10. In a headlight dimmer circuit for a first vehicle having headlights with upper and lower beams, a power supply, an amplifier connected to be energizable from said power supply, a headlight control relay having an operating coil, means for connecting said operating coil to be operated by said amplifier, a main photocell connected to control said amplifier, said photocell and said amplifier being so connected that under dark conditions said amplifier passes sufficient current to energize said relay operating coil to control the headlights of the first vehicle in the upper beam illumination condition, rectifier means operated from said power supply, normally open and normally closed double-throw contacts operable by said headlight control relay, a time delay condenser, means for establishing a charging circuit for said time delay condenser from said rectifier means through the normally open contacts of said headlight control relay, a time delay lamp, means for establishing a time delay condenser discharging circuit through said time delay lamp and the normally closed contacts of said headlight control relay, means for establishing said time delay lamp in light exchange relationship with said main photocell, a time delay photocell, said time delay photocell having variable impedance in accordance with the incident light thereof, means for directing incident rays from other vehicles on said time delay photocell, and means for establishing said time delay photocell in said condenser discharge circuit, whereby the variable impedance of said time delay photocell establishes a variable time delay period of said condenser through said time delay lamp generally inversely proportional to the intensity of the incident rays on said time delay photocell.

11. In a photocell circuit, a control relay having an operating coil, a main photocell connected to control said relay coil, a power supply, a time delay condenser, means controlled by said relay for establishing a charging circuit for said time delay condenser from said power supply, means controlled by said relay for establishing a time delay condenser discharging circuit, means controlled by said condenser discharge circuit to increase the illumination on said main photocell, a time delay photocell, and means for establishing said time delay photocell in said condenser discharge circuit.

12. In a photocell circuit, an electron tube, a control relay having an operating coil energizable from an alternating current source through said electron tube, a photocell sensitive to infrared waves and connected to control said relay coil through said electron tube, an infrared filter disposed in front of said photocell, first and second double-throw contacts operable by said control relay, a time delay condenser, means for establishing a charging circuit for said time delay condenser from a direct current source through said first contacts, means for establishing a time delay condenser discharging circuit through said second contacts, and illumination means in said condenser discharge circuit and energized directly by said condenser to increase the illumination on said photocell.

13. In a headlight dimmer circuit for use in a first vehicle with the headlights having high and low range illumination conditions, a photocell sensitive to both visible light waves and infrared waves and connected to control the conditions of the headlights of the first vehicle by variations in illumination on said photocell, a time delay condenser, means controlled by said headlight high range condition for establishing a charging circuit for said time delay condenser, means controlled by said headlight low range condition for establishing a time delay condenser discharging circuit, time delay lamp means in said condenser discharge circuit to increase the illumination on said main photocell in predominantly the infrared spectrum, means for directing incident rays from oncoming healights and outgoing taillights of a second vehicle on said phtocell, and an infrared filter disposed in front of said photocell to eliminate a major portion of said visible light waves and thus make more nearly equal the distance to the photocell at which both a headlight and taillight will operate said photocell.

14. In a photocell circuit, a relay, a photocell connected to control said relay, a time delay capacitor, means controlled by said relay for establishing charging and discharging circuits for said time delay capacitor, means controlled by said capacitor discharge circuit to increase the illumination on said photocell, and photosensitive means connected in said capacitor discharge circuit to control the time of capacitor discharge in accordance with incidence of light on said photosensitive means.

15. In a photocell circuit, a control relay having an operating coil, a main photocell connected to control said relay coil, a time delay capacitor, means controlled by said relay for establishing separate charging and discharging circuits for said time delay capacitor, means controlled by said capacitor discharge circuit to increase the illumination on said main photocell, a time delay photocell, and means for establishing said time delay photocell in said capacitor discharge circuit.

16. In a headlight control circuit for a first vehicle having headlights with upper and lower beams, a headlight control relay, a main photocell connected to control said relay such that under dark conditions said relay is energized to control the headlights of the first vehicle in the upper beam illumination condition, normally closed contacts operable by said headlight control relay, a time delay capacitor, a time delay lamp, means for establishing a time delay capacitor discharging circuit through said time delay lamp and the normally closed contacts of said headlight control relay, means for establishing said time delay lamp in light exchange relationship with said main photocell, a time delay photocell, said time delay photocell having variable impedance in accordance with the incident light thereon, means for directing incident rays from other vehicles on said time delay photocell, and means for establishing said time delay photocell in said capacitor discharge circuit.

17. In a headlight control circuit for a first vehicle having headlights with upper and lower beams, a headlight control relay, a main photocell connected to control said relay such that under dark conditions said relay is energized to control the headlights of the first vehicle in the upper beam illumination condition, normally open and normally closed double-throw contacts operable by said headlight control relay, a time delay capacitor, means for establishing a charging circuit for said time delay capacitor through the normally open contacts of said headlight control relay, a time delay lamp, means for establishing a time delay capacitor discharging circuit through said time delay lamp and the normally closed contacts of said headlight control relay, means for establishing said time delay lamp in light exchange relationship with said main photocell, a time delay photocell, said time delay photocell having variable impedance in accordance with the incident light thereon, means for directing incident rays from other vehicles on said time delay photocell, and means for establishing said time delay photocell in said capacitor discharge circuit, whereby the variable impedance of said time delay photocell establishes a variable time delay period of said capacitor through said time delay lamp generally inversely proportional to the intensity of the incident rays on said time delay photocell.

18. In a headlight dimmer circuit for a first vehicle having headlights with upper and lower beams, an amplifier, a headlight control relay connected to be operated by said amplifier, a main photocell connected to control said amplifier, said photocell and said amplifier being so connected that under dark conditions said amplifier passes sufficient current to energize said relay to control the headlights of the first vehicle in the upper beam illumination condition, normally open and normally closed double-throw contacts operable by said headlight control relay, a time delay capacitor, means for establishing a charging circuit for said time delay capacitor through the normally open contacts of said headlight control relay, a time delay lamp, means for establishing a time delay capacitor discharging circuit through said time delay lamp and the normally closed contacts of said headlight control relay, means for establishing said time delay lamp in light exchange relationship with said main photocell, a time delay photocell, said time delay photocell having variable impedance in accordance with the incident light thereon, means for directing incident rays from other vehicles on said time delay photocell, and means for establishing said time delay photocell in said capacitor discharge circuit, whereby the variable impedance of said time delay photocell establishes a variable time delay period of said capacitor through said time delay lamp generally inversely proportional to the intensity of the incident rays on said time delay photocell.

References Cited in the file of this patent
UNITED STATES PATENTS

| | | |
|---|---|---|
| 2,240,843 | Gillespie | May 6, 1941 |
| 2,423,278 | Willis | July 1, 1947 |
| 2,493,307 | Moore et al. | Jan. 3, 1950 |
| 2,560,748 | Silva | July 17, 1951 |